Patented Jan. 23, 1940

2,188,274

UNITED STATES PATENT OFFICE 2,188,274

PURIFICATION OF ALCOHOL

Albert H. Bump, Watertown, Mass., assignor to New England Alcohol Company, Everett, Mass.

No Drawing. Application May 29, 1936, Serial No. 82,507

4 Claims. (Cl. 202—57)

The present invention relates to the art of purifying aliphatic alcohols of hydrocarbon or molasses origin and it has particular relation to the refining of alcohols for the purpose of eliminating foul-smelling compounds commonly associated with these products.

The present invention which is based upon the results of exhaustive observations enables one to eliminate impurities present in minute amounts, which impurities render the alcohol unfit for beverage and food stuff purposes. One object of the invention is to provide a commercially applicable method of treatment whereby alcohol, such, for example as "heads" alcohol, may be converted into alcohol of extract or Cologne spirit quality.

My method of treatment involves a combination of steps; in its preferred form it includes:

1. Subjecting the alcohol to the action of a water soluble manganate or permanganate under non-alkaline, or preferably, only mildly acidic conditions.

2. Aeration of the alcohol whereby a portion of the odoriferous impurities are removed.

3. Subjecting the aerated mixture to caustic alkali at elevated temperatures; and 4. Distilling the product carefully under conditions which avoid contamination by entrainment.

The following example is illustrative of one embodiment:

A charge of 1000 gallons of freshly distilled "heads" alcohol is introduced into a still together with approximately .2% by weight of potassium or sodium permanganate which has been dissolved in water to form a substantially saturated solution. The alcohol is agitated with the permanganate until the pink color disappears. Usually this requires from 20 to 60 minutes at ordinary temperatures. At higher temperatures, say 50° to 60° C., the reaction is more rapid. Generally, I prefer to use ordinary temperatures rather than the higher temperatures, even though the reaction requires a longer period of time since at higher temperatures a secondary reaction is accelerated which results in the conversion of the alcohol product to acetaldehyde.

The quantity of permanganate is not limited to the amount specified; less can be used, especially when the alcohol has been held in vented storage tanks for several weeks or months prior to the purification treatment. More permanganate may be used, particularly at temperatures appreciably below atmospheric, if it is desired to hasten the oxidation reaction. Although a saturated aqueous solution of permanganate is described the solution need not be saturated. When it is important to maintain the proof or strength of the alcohol being treated or for any other purpose, the permanganate or its equivalent of a manganate may be added in the form of a finely ground solid. The time required for disappearance of the permanganate color with continued agitation of the solution will be about twice that required when using an aqueous solution of permanganate. Both methods of applying the oxidizing agent yield a product alcohol of excellent quality. Quantities of permanganate from .02% to 3.0% by weight on the alcohol being treated will generally result in satisfactory purification of the impure alcohols encountered in practice. Other permanganates than sodium and potassium may be used. Likewise, manganates (e. g., $K_2MnO_4$), either crude or pure, may be employed satisfactorily, particularly with freshly condensed "heads" alcohol which contains a relatively high proportion of dissolved carbon dioxide. The carbon dioxide converts the manganate to permanganate, the latter being the more powerful oxidizing agent.

In case the "heads" alcohol has been in storage for several weeks or months, thereby allowing the dissolved carbon dioxide to escape, acidity may be increased for the conversion by bubbling carbon dioxide through the alcohol, or by adding very small amounts of mineral acid. The conversion reaction is thereby accelerated. During the treatment with permanganate or its equivalent, the malodorous impurities appear to be largely eliminated or converted to non-odorous products by a process of selective, destructive oxidation. The permanganate is reduced to manganese dioxide.

The next stage of the purification is accomplished by aeration of the heated alcohol. After the pink color of the permanganate has disappeared the alcohol is refluxed gently while compressed air is introduced and allowed to permeate upwardly through the alcohol and out through the reflux condenser which, preferably, is maintained at 40° to 60° C. to prevent condensation of impurities carried by the air. Once the alcohol is boiling gently, the aeration and boiling are continued for from one to four hours. Air at fifteen pounds gage pressure is satisfactory and the amount of air which is preferred for the combined reasons of economy and efficacy is approximately .30 cubic foot of free air per minute per thousand gallons of alcohol being treated.

During the period of aeration under the prescribed conditions of control very little liquid distills; at most the distillate amounts to only a few tenths of 1% of the charge in the still or boiler. The process is not to be limited to the stated quantity of air for aeration, time of aeration or temperature of reflux. More or less air than the preferred .30 cubic foot of free air per minute per thousand gallons of alcohol may be employed. To obtain pure alcohol with smaller amounts of air, say down to .1 cubic foot per minute, it is only necessary to prolong the time of aeration. The time of aeration may be shortened by using higher rate of air flow, for example, as high as five cubic feet of free air per minute per 1000 gallons of alcohol. The disadvantage of higher air flow rates is that appreciably increased amounts of alcohol are carried through the reflux to the total condenser. The alcohol so recovered in the total condenser is quite malodorous and fit only for completely denatured formulae.

After completion of the aeration treatment the air stream is discontinued and there is added to the alcohol in the boiler about 1% by weight of solid caustic soda (flakes or ground) or about 2% by weight of 50% commercial caustic soda solution. If solid caustic is used agitation is provided until dissolution is complete. The resulting solution is refluxed gently. Solid caustic or commercial 50% solution of caustic may be used according to the desirability of maintaining the proof of the alcohol. The reflux condenser temperature is maintained at 40° to 60° C. for purposes of preventing condensation and return of the malodorous impurities which tend to pass off from the alcohol in the still. When operating under the outlined method of control the alcohol which passes through the reflux condenser will seldom exceed 1% of the total liquid and usually amounts to only ¼ of 1%. Moreover, a large part of this can be recovered in a total condenser. The amount of caustic soda used is not to be limited to the amount prescribed in the example. More or less may be used. With larger amounts of caustic soda shorter periods of reflux will produce wholly satisfactory alcohol. With somewhat smaller amounts, longer periods of reflux will produce satisfactory alcohol. The optimum balance between economy, time required, and quality of alcohol produced will be obtained with amounts of caustic soda between one-half of 1% and 5% by weight on the alcohol being treated. Likewise, the time of reflux with caustic soda is not to be limited to the six to eight hour period prescribed. For example, "heads" alcohol which has been held in storage for several months prior to treatment by this process, will be sufficiently purified by refluxing with caustic for three to five hours. On the other hand, fresh "heads" alcohol, which perhaps has not received thorough treatment with permanganate and air, may require from ten to fifteen hours under reflux with caustic soda. During the treatment with caustic the alcohol assumes an orange-brown color which is more readily noticeable if the manganese dioxide formed during the permanganate treatment is allowed to settle. It also develops an odor reminiscent of cinnamic aldehyde.

The final stage of the process consists in the simple or fractional distillation of the alcohol from the residue of highly colored resinous products, manganese dioxide and caustic soda, while avoiding entrainment insofar as this is possible. The first portions of the distillate are collected separately since they are purer than the original untreated alcohol, but less pure than the major portion of the distillate. Usually the first distillate amounting to 10% of the charge is collected separately and drawn off to storage and may be reworked by the purification process or converted to completely denatured formulae. The odors of successive portions of the alcohol distillate are compared with that of pure alcohol of extract grade.

The presence of reducing substances which is a measure of purity, is determined by the standard permanganate method as follows:

Fifty cubic centimeters of alcohol are placed in a clean two ounce wide mouth glass bottle provided with glass stopper. Two cubic centimeters of an aqueous solution of potassium permanganate are added with agitation to the alcohol. The permanganate solution is made from C. P. potassium permanganate and distilled water and is of a concentration equivalent to .2 gram of permanganate per liter. The stopper is inserted and the bottle is placed in an essentially lightproof compartment which in turn is supported in a water type thermostat designed to maintain temperature at 60° F. plus or minus .03° F. The bottle is removed and replaced quickly at intervals to note when the pink permanganate color has disappeared. Time is counted from the moment of mixing the permanganate solution and alcohol. When tested by this method the raw, untreated "heads" alcohol reacts with the permanganate within 20 to 30 seconds.

In order to illustrate the advantages attending the application of the principles of applicant's invention for the purification of relatively impure "heads" alcohol, comparative tests were conducted upon samples of "heads" alcohol obtained by simple distillation and additional samples, one of which was subjected to simple aeration; a second of which was aerated and treated with hot caustic soda under reflux; a third of which was subjected to oxidation by means of permanganate and was subsequently refluxed with caustic soda; a fourth was treated with potassium dichromate, aerated and refluxed with caustic soda; and a fifth was treated in accordance with the present invention with permanganate, aerated and subjected to reflux with caustic soda. The amount of odoriferous impurities contained in these samples was estimated by determination of the time required for disappearance of color in the solution. The results of these tests follow:

| | Method of treatment | Permanganate test. Minutes required for disappearance of pink color | |
|---|---|---|---|
| | | First 10% | Succeeding 70% |
| 1 | Untreated "heads" alcohol simple distillation. | 8 secs | 1.0 min. |
| 2 | Aerated followed by refluxing. No oxidizing agent, no caustic soda. | 25 secs | 5.0 mins. |
| 3 | Aerated hot followed by reflux with caustic soda. | 5 mins | 19.0 mins. |
| 4 | Oxidation with permanganate followed by hot reflux with caustic soda. No aeration. | 12 mins | 34 mins. |
| 5 | Aerated-potassium dichromate as oxidizing agent followed by reflux with caustic soda. | 19.5 mins | 37.0 mins. |
| 6 | The process of this invention; oxidation with permanganate, aeration reflux with caustic soda. | First 5%—27 mins. Succeeding 5%–43 mins. Succeeding 80%–61 mins. Succeeding 5%–56 mins. | |

Pure ethyl alcohol, undenatured for beverage, fine medicinal and food uses is known as extract grade and rarely will such alcohol have a permanganate test of less than fifty minutes. More particular alcohol manufacturers strive to maintain their product with a permanganate test of about 55 minutes.

Thus, the process of this invention will convert about 80% of "heads" alcohol having a permanganate test of 20 to 30 seconds to alcohol of extract grade having a permanganate test of about 60 minutes.

The data of Example 6 show that 95% of the alcohol charged to the still has been recovered as distillate. One of the chief features of economy of this process pertains to steam consumption. "Heads" alcohol may be rectified in a distilling column having fifty to fifty-five plates of the type used for the final rectification and purification of alcohol in commercial practice. A minimum reflux ratio of about six to one is used to obtain any appreciable purification. As a result of such rectification about 50% of the "heads" alcohol treated will be recovered as a distillate having a permanganate test not in excess of 25 mins. The steam cost for attaining this relatively poor product owing to the high reflux ratio will vary from about 1 to 2 cents per gallon of alcohol distilled. By repeated rectification the quality of the alcohol is improved but never reaches the desired goal of 55 minutes permanganate test. If an attempt is made to reach this degree of purity by further rectification, steam cost will approach the prohibitive value of 5 to 6 cents per gallon. The process of this invention specifically minimizes steam cost by providing a combination of low cost steps which taken together obviate the necessity of providing appreciable quantities of reflux liquid during any of said steps including the final distillation.

"Heads" alcohol, when treated by the process of this invention, is entirely freed of malodorous impurities and of other impurities which readily reduce potassium permanganate as determined by the standard analytical, permanganate method for pure alcohol. From seventy-five to eighty per cent of the "heads" alcohol is economically recovered as pure alcohol of beverage quality; that is, the grade known industrially as extract alcohol. A plant regularly producing 20% of "heads" alcohol and 80% of extract alcohol can, by application of the process of this invention, increase the proportion of extract alcohol to about 95% of total production. This represents a noteworthy advance in the art of alcohol manufacture. When producing greater proportions of "heads" alcohol, say 30 to 40%, these can also be economically treated with the result that about 95% of total production is obtained as alcohol of extract quality. The chief economic significance of the process is that it relieves the alcohol manufacturer from the necessity of disposing of a considerable proportion of his product in the highly competitive, completely denatured alcohol market.

The process previously described is also applicable to alcohols prepared synthetically by various methods, for example, by hydrolysis of the sulfuric acid esters of olefine hydrocarbons.

Olefines from petroleum cracking operations may be converted to alcohols by absorption in sulphuric acid of appropriate strength, hydrolysis of the resulting mixture of mono and dialkyl sulfates and finally distilling the crude alcohols from the solution or mixture formed during the hydrolysis. Ethyl alcohol, isopropyl alcohol and tertiary butyl alcohol, for example, are prepared commercially in this manner. Those experienced in the art recognize that alcohols so prepared from olefines have very objectionable odors due in part to unknown sulfur compounds and in part to other impurities of obscure nature. For example, isopropyl and tertiary butyl alcohols so prepared must be given special chemical treatment to remove these objectionable odors. The process of this invention is especially adapted to render such alcohols entirely free from objectionable odors.

Although only the preferred forms of the invention are described, it will be understood by those skilled in the art that the invention is not limited thereto and that certain modifications may be made therein without departure from the spirit of the invention. To illustrate, while I prefer to effect aeration as a separate step, one may aerate during the caustic alkali treatment. Similarly, the aeration step as described may be prolonged through the caustic treatment. By far the best results are obtained when following the procedure and order substantially as described.

What I claim is:

1. In the processing of "heads" alcohol to produce alcohol of Cologne's spirits quality, the steps which include selective oxidation of malodorous impurities by treatment of the "heads" alcohol with a water soluble permanganate under acid conditions, aeration of the permanganate treated alcohol under conditions whereby volatile impurities are removed from the liquid alcohol, digestion of the alcohol in presence of caustic alkali to render the alcohol separable by distillation from otherwise volatilizable impurities, and finally, distillation of the alcohol product while avoiding entrainment of residual impurities.

2. In the processing of ethyl alcohol to produce Cologne's spirits by selectively oxidizing malodorous impurities in the alcohol with a water soluble manganate salt under acid conditions, the improvement characterized in that the alcohol which has been subjected to the manganate is aerated under conditions whereby volatile impurities are removed from the liquid alcohol and digested with caustic alkali whereby otherwise volatile impurities are rendered separable from the alcohol by distillation, and subsequently distilling the product under conditions which avoid entrainment of residual impurities.

3. The method of purifying alcohols selected from the group, ethyl, propyl and butyl, characterized in that the oxidizable impurities are decomposed selectively by the action of a water soluble manganic salt under acid conditions, thereafter the resulting liquid product is subjected to aeration under conditions whereby impurities relatively more volatile than alcohol are separated and digesting the alcohol with caustic alkali whereby otherwise volatilizable impurities are rendered relatively non-volatile and, finally, distilling the alcohol under conditions which substantially avoid entrainment of residual impurities.

4. In the processing of "heads" alcohol to produce a product of Cologne's spirits quality, the steps which include selectively oxidizing malodorous impurities by treatment of the alcohol with water soluble permanganate under acid conditions and in an amount equivalent to from .02% to 3.0% by weight of the alcohol treated, subsequently subjecting the liquid alcohol to aeration to remove volatile impurities from the liquid alcohol and digesting said liquid alcohol with a caustic alkali whereby otherwise volatile impurities are rendered separable by distillation, the amount of said caustic alkali being from approximately one-half of one per cent to five per cent by weight of the alcohol and, finally, distilling the product under conditions which avoid entrainment of residual impurities.

ALBERT H. BUMP.